UNITED STATES PATENT OFFICE 2,511,166

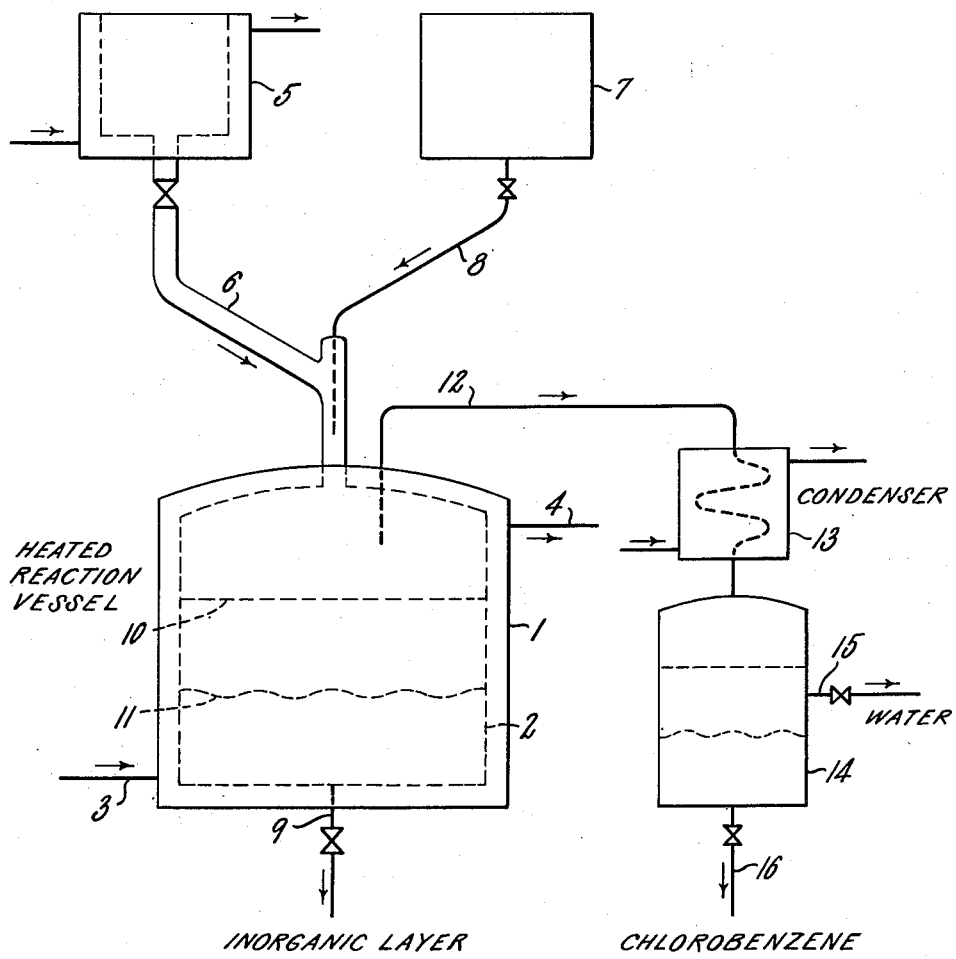

RECOVERY OF CHLOROBENZENE

Richard H. F. Manske, Guelph, Ontario, Canada, Elwood B. Trickey, Easton, Pa., and Gordon S. Myers, Guelph, Ontario, Canada, assignors to United States Rubber Company, New York, N. Y., a corporation of New Jersey Application September 30, 1947, Serial No. 777,103
In Canada June 12, 1947

7 Claims. (Cl. 260—650)

This invention relates to a continuous process of recovering chlorobenzene (by which term herein is meant monochlorobenzene) from p-chlorobenzenesulfonic acid by desulfonation thereof.

During the process of manufacturing DDT (2, 2-bis (p-chlorophenyl)-1,1,1-trichloroethane) from chlorobenzene and chloral in the presence of concentrated sulfuric acid, large amounts of chlorobenzene are lost by conversion to chlorobenzenesulfonic acid instead of to DDT. This loss of chlorobenzene substantially increases the cost of manufacturing DDT. Moreover, the chlorobenzenesulfonic acid formed in the DDT process constitutes a major problem in waste disposal which necessitates special treatment of the wastes from the DDT process and thereby further increases the manufacturing cost of DDT.

For the foregoing reasons it would be distinctly advantageous to be able to convert economically the p-chlorobenzenesulfonic acid formed in the DDT process to chlorobenzene for reuse in the making of DDT. We have invented a process which will accomplish this purpose. The principal aim and object of the present invention is to provide a commercially feasible process of converting the p-chlorobenzenesulfonic acid by-product of the DDT process to chlorobenzene and recovering the chlorobenzene for reuse in the DDT process.

The literature discloses a method for the hydrolysis of p-chlorobenzenesulfonic acid by treatment with concentrated phosphoric acid at 200° C.; Chem. Abs. 32, 1549 (1938). Such a hydrolysis involving the use of expensive phosphoric acid could not be used for the commercial preparation of the relatively cheap chlorobenzene. The present invention provides a simple and inexpensive method for the recovery of chlorobenzene by hydrolysis of p-chlorobenzenesulfonic acid.

The hydrolysis reaction whereby chlorobenzene is prepared from p-chlorobenzenesulfonic acid is as follows:

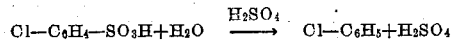

$$Cl\text{—}C_6H_4\text{—}SO_3H + H_2O \xrightarrow{H_2SO_4} Cl\text{—}C_6H_5 + H_2SO_4$$

Our invention is a continuous process of effecting the hydrolysis of p-chlorobenzenesulfonic acid to chlorobenzene and recovering the chlorobenzene so produced. Our process comprises continuously boiling a mixture comprising a major proportion of p-chlorobenzenesulfonic acid, a minor proportion of sulfuric acid and a minor proportion of water at a temperature below 240° C. and above 200° C., continuously removing vapors of water and chlorobenzene distilling from the boiling mixture, continuously condensing the distilled vapors to recover the chlorobenzene, adding to said mixture during said boiling p-chlorobenzenesulfonic acid, adding to said mixture during said boiling an alkali metal compound capable of combining with sulfuric acid to form alkali metal acid sulfate, the amount of the added alkali metal compound being insufficient to combine with all the sulfuric acid in the mixture, adding to the mixture during the boiling water in amount sufficient to maintain the boiling point of the mixture at below 240° C., the amount of the alkali metal compound being such that an aqueous inorganic layer forms below the mixture, this aqueous inorganic layer comprising alkali metal acid sulfate, sulfuric acid, and water, and withdrawing the aqueous inorganic layer so formed at a rate corresponding substantially to that at which it is formed.

The alkali metal compound employed in carrying out the present invention may be any suitable such compound which is capable of combining with sulfuric acid to form the alkali metal acid sulfate. Examples are the alkali metal hydroxides, chlorides, and sulfates although we are not limited to these three types of alkali metal compounds. Generally speaking the compounds of sodium are preferred for the practice of the present invention, and of these sodium hydroxide is preferred. The next most preferable compound is sodium sulfate. Sodium chloride is completely operative but in some cases use thereof may be considered objectionable because it involves the formation of hydrogen chloride which goes overhead with the vapors of chlorobenzene and water distilled from the mixture Upon condensation of the vapors the hydrogen chloride saturates the aqueous phase and the uncondensed gaseous hydrogen chloride phase may be bled off continuously from the condensate accumulator.

The condensed overhead vapors separate into two liquid phases, namely, an upper water phase and a lower chlorobenzene phase These two phases are separately withdrawn from the condensate accumulator. The chlorobenzene phase is in a form suitable, after drying, for recycling directly to the DDT process. The water phase may conveniently be recycled to the hydrolysis and distilling unit employed in carrying out the present invention, for example the recycled water may be used for making up an aqueous solution of the alkali metal compound added to the hydrolysis reaction vessel.

Our invention is a commercially feasible continuous process for the conversion of p-chlorobenzenesulfonic acid to chlorobenzene at a very fast rate in yields which are 90% or better of the theoretical. The success of our process is due to our discovery of a unique continuous method of removing the sulfuric acid formed as a product of the hydrolysis. The fact that the hydrolysis mixture comprises p-chlorobenzenesulfonic acid as the major component with only a small amount of sulfuric acid and only a small amount of water, which small amounts are necessary to start and maintain the hydrolysis, allows a small reactor to handle a very large amount of the sulfonic acid in a given period of time. It will be seen from the above equation of the reaction that 98 parts of sulfuric acid are formed from every 193 parts of sulfonic acid that are hydrolyzed. This sulfuric acid would, of course, unless removed, accumulate in the reactor and prevent the hydrolysis from being carried out by a continuous process without the necessity of discharging the contents of the reactor very frequently. Moreover, in a batch process where the sulfuric acid is allowed to accumulate, the proportion of sulfuric acid to p-chlorobenzenesulfonic acid increases steadily during the hydrolysis so that the rate of chlorobenzene formation falls off continuously.

Our invention involves adding the alkali metal compound, such as sodium hydroxide, sodium sulfate or sodium chloride, which combines with the sulfuric acid formed in the hydrolysis to form sodium acid sulfate. The reactions are as follows:

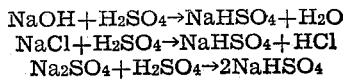

This sodium acid sulfate forms with sulfuric acid and water an inorganic liquid bottom layer at the temperature of the hydrolysis (over 200° C. and generally at least 220° C. but less than 240° C.) which readily separates from a top organic layer consisting essentially of molten p-chlorobenzenesulfonic acid for the most part, a small amount of sulfuric acid and a small amount of water, and may be drained off during the reaction without interrupting the hydrolysis. The amount of sulfuric acid-removing-material must be carefully controlled so that it does not remove all of the sulfuric acid as sodium acid sulfate but leaves a small amount present to effect the hydrolysis. If all the sulfuric acid is removed, hydrolysis to chlorobenzene stops. In actual operation, much less than the theoretical amount of sulfuric acid-removing-material is employed since it is found that the bottom inorganic layer of sodium acid sulfate will remove a considerable amount of sulfuric acid as dissolved acid.

We have found that a satisfactory continuous process is obtained if enough of the sulfuric acid-removing-material is employed to give a bottom inorganic layer which varies in composition from sodium acid sulfate containing only enough sulfuric acid and only enough water to give a liquid layer at the temperature of hydrolysis to a composition comprising 52% sodium acid sulfate, 37% sulfuric acid and 11% water. Of the three components named, the sodium acid sulfate is present in greatest amount, sulfuric acid being next and water being least in amount. It will of course be understood that other materials and by-products may also be present in the inorganic layer although they are usually in small amounts.

The amount of water in the bottom inorganic layer is dependent on the amount of water added to the reaction vessel and the amount of water added to the reaction vessel is only enough to maintain the boiling point below 240° C. and preferably at least 220° C.

In the preferred practice of the present invention, the operation is so conducted that the inorganic layer contains from 68 to 72 parts of sodium acid sulfate, from 23 to 27 parts of sulfuric acid and from 4 to 6 parts of water, the total of these three being 100 parts. All percentages and parts referred to herein are by weight.

The optimum composition of the inorganic layer is 70 parts of sodium acid sulfate, 25 parts of sulfuric acid and 5 parts of water.

The alkali metal compound must be employed in amount sufficient to give two layers which separate. If an insufficient amount is employed, there is no separation of layers in the hydrolysis zone. If too much of the alkali metal compound is employed, the solid sodium acid sulfate separates and forms a slurry, not the two layers necessary for the practice of the present invention. Moreover, use of too much alkali metal compound causes neutralization of all of the sulfuric acid and causes cessation of the hydrolysis.

Pure p-chlorobenzenesulfonic acid need not necessarily be employed for the practice of the present invention. For instance crude p-chlorobenzenesulfonic acid obtained directly from the DDT spent sulfuric acid liquor, which crude material is wet with sulfuric acid, works equally well in the present invention. In fact the present invention has its greatest value when applied to such crude starting material formed as a by-product in DDT manufacture.

In general the process involves charging a reactor, constructed of glass or of suitable corrosion-resistant materials which are apparent to those skilled in the art with p-chlorobenzenesulfonic acid, and small amounts of sulfuric acid and water such that the boiling point is lowered to below 240° C. and preferably to from 220° C. up to 240° C. The charge is continuously maintained at its boiling point. Water and chlorobenzene distill continuously from the boiling mixture. p-Chlorobenzenesulfonic acid is added to this reaction mixture either simultaneously and continuously or intermittently with enough sulfuric acid-removing-material to give a separate inorganic layer below the boiling mixture. Only enough water is returned to the reactor, either from the distillate or added separately, so that the boiling point of the contents is maintained at below 240° C. and preferably at from 220 up to 240° C. A temperature of 230° C. is often optimum. The inorganic layer settles to the bottom of the vessel and is withdrawn as it is formed. Such a process gives a maximum rate of hydrolysis to chlorobenzene and is economically attractive. Tar formation is reduced to a minimum.

In starting up in accordance with the present invention, it is usually desirable to add a little sulfuric acid if none is already present in the p-chlorobenzenesulfonic acid. However, the reaction can be started up with water alone, since the reaction generates sulfuric acid which then catalyzes the hydrolysis.

In a continuous operation it is preferred to carry out all of the steps of the process continuously. The boiling or distillation step and the removal of the liberated vapors of water and chlorobenzene are always carried out continuously. The withdrawal of the aqueous inorganic layer may be carried out intermittently, but in ordinary practice it is carried out continuously. In any event the withdrawal is at a rate corresponding substantially to the rate at which the aqueous inorganic layer is formed. The additions of p-chlorobenzenesulfonic acid, of water and of alkali metal compound may be carried out intermittently if desired but are preferably carried out continuously.

The process is most conveniently conducted at atmospheric pressure. However, pressures ranging from slightly below atmospheric to moderate superatmospheric may be employed. Use of subatmospheric pressure is usually impractical because of the necessity of providing means for reducing the pressure. Use of pressures moderately above atmospheric, for example up to 50 pounds per square inch gauge are more practical although increasing the expense of equipment. The preferred range of at least 220 but less than 240° C. for boiling of the mixture undergoing hydrolysis applies to operation at substantially atmospheric pressures, say at pressures ranging from minus 5 to plus 20 pounds per square inch gauge.

Referring to the accompanying drawing, there is provided a reaction vessel 2 in which the hydrolysis is conducted. Vessel 2 is equipped with any suitable means such as jacket 1 for heating the same and maintaining the contents at the boiling temperature. Jacket 1 may be heated by a heating medium entering via line 3 and leaving via line 4. A supply of molten p-chlorobenzene sulfonic acid is maintained in jacketed vessel 5 and is added by valved line 6. An aqueous solution of the alkali metal compound is added from vessel 7 via valved line 8. The aqueous inorganic layer collecting in the bottom of the reactor 2 is withdrawn via valved line 9. The level of the boiling liquid is indicated by reference numeral 10 and the interface between the lower inorganic layer and the upper organic layer is indicated by reference numeral 11.

The vapors of water and chlorobenzene are withdrawn via line 12 from the vapor space in reactor 2 and are condenser in condenser 13. The condensate is collected in accumulator 14 where layer formation takes place. The upper layer of water is withdrawn via line 15 while the chlorobenzene product layer is withdrawn via line 16.

*Example*

As the raw material for this example there was used a centrifuged filter-cake containing approximately 58.5% p-chlorobenzenesulfonic acid, 25.3% sulfuric acid and 14% water and 1-3% of water-insoluble impurities, this crude raw material being formed as a by-product of the manufacture of DDT. Further purification is not necessary for the success of our invention although pure p-chlorobenzenesulfonic acid containing a catalytic amount of sulfuric acid works equally well.

Using equipment like that shown in the accompanying drawing, 200 parts by weight of this crude p-chlorobenzenesulfonic acid was introduced to the reaction vessel and heat was supplied until the material boiled. Water and chlorobenzene vapors were removed overhead and condensed and the condensate was collected until the temperature of the reaction mixture reached 230° C. at which temperature water was supplied or withheld in such manner as to maintain this temperature. When the temperature reached 230° C. heating was continued until 13.2 parts by weight of chlorobenzene had been collected. Motion crude p-chlorobenzenesulfonic acid was then added through pipe 6 in portions of 77 parts by weight at such a rate that the temperature did not fall below 220° C. At the same time the addition of aqueous 47% NaOH was started at a rate of 24 parts by weight for every 77 parts by weight of the p-chlorobenzenesulfonic acid added. For every portion of 77 parts by weight of crude p-chlorobenzenesulfonic acid added, 26.4 parts by weight of chlorobenzene were collected. When the above qualities of materials are used the rate of collection of chlorobenzene is about 2.75-2.97 parts by weight per minute if vigorous boiling is maintained. Chlorobenzene can be collected at this rate as long as the additions of p-chlorobenzenesulfonic acid and aqueous alkali are continued. As the reaction proceeded the reaction mixture separated into two layers, a top organic layer of p-chlorobenzenesulfonic acid containing some sulfuric acid and some water and a bottom inorganic layer containing sodium acid sulfate, sulfuric acid and water in the approximate ratio of 70/25/5. As the additions were continued, the bottom layer increased in volume until the reaction vessel became too full to allow vigorous boiling. At this point, without interrupting the boiling, the valve on the take-off pipe 9 was opened and the clear bottom layer was drained off. If the addition of crude p-chlorobenzenesulfonic acid and alkali is continued indefinitely, chlorobenzene and the inorganic bottom layer can also be collected indefinitely, thus making the process continuous.

During a period of continuous operation of 400 minutes in accordance with this example, 1081 parts by weight of chlorobenzene were recovered from 3320 parts by weight of crude p-chlorobenzenesulfonic acid. The yield was 95% of theoretical.

From the foregoing description it will be seen that the present invention provides a simple and economical continuous method of recovering chlorobenzene from p-chlorobenzenesulfonic acid. Among the many advantages of the process are its simplicity and cheapness, its adaptability to crude p-chlorobenzenesulfonic acid especially that formed as a by-product of DDT manufacture, the high rate of hydrolysis, and the fact that a minimum of undesirable reactions, particularly sulfonation, take place. Another advantage is that the apparatus requirements for carrying out the process are simple. Another advantage is that the DDT waste disposal problem is greatly simplified since the aqueous inorganic layer withdrawn in accordance with the process of the present invention is much more easily disposed of than the p-chlorobenzenesulfonic acid. Another advantage is that the aqueous layer withdrawn from the condensate receiver may be recycled, for example for use in making up the aqueous solution of the alkali metal compound added to the reactor to combine with the sulfuric acid liberated by the hydrolysis, the recycled water thus supplying most of the water requirements of the process. Another advantage is that the two products of the hydrolysis reaction, namely chlorobenzene and sulfuric acid are very rapidly removed from the zone of reaction, namely the upper organic layer, the chlorobenzene by distillation in admixture with water and the sulfuric acid by chemical combination with the alkali metal compound and passage into the lower inorganic layer which is removed continuously or intermittently as necessary. Many other advantages of the present invention will be apparent to those skilled in the art.

As used herein, the terms "major proportion" and "minor proportion" denote a proportion exceeding 50% of the mixture and a proportion which is less than 50% of the mixture, respectively. Thus by the expression "a major proportion of p-chlorobenzenesulfonic acid, a minor proportion of sulfuric acid and a minor proportion of water," is meant that the p-chlorobenzenesulfonic acid is present in amount exceeding 50 weight percent of the sum of these three components, while sulfuric acid and water are each present in amount less than 50%, usually substantially less. In such a mixture the sulfuric acid is usually present in amount greater than the water although this is not a necessary requirement of the process. It is sufficient if the amount of water present with the p-chlorobenzenesulfonic acid is sufficient to combine with the p-chlorobenzenesulfonic acid and also to furnish a small amount of water for the inorganic layer and if the amount of sulfuric acid is sufficient to catalyze the hydrolysis.

Having thus described our invention, what we claim and desire to protect by Letters Patent is:

1. A continuous process of effecting the hydrolysis of p-chlorobenzenesulfonic acid to chlorobenzene and recovering said chlorobenzene which comprises continuously boiling an organic mixture comprising a major proportion of p-chlorobenzenesulfonic acid, a minor proportion of sulfuric acid and a minor proportion of water at a temperature above 200° C. and below 246° C., continuously removing vapors of water and chlorobenzene distilling from the boiling mixture, continuously condensing said vapors to recover the chlorobenzene, adding to said mixture during said boiling p-chlorobenzenesulfonic acid, adding to said mixture during said boiling an alkali metal compound capable of combining with sulfuric acid to form alkali metal acid sulfate, the amount of said added alkali metal compound being insufficient to combine with all the sulfuric acid in the mixture, adding to said mixture during said boiling water in amount sufficient to maintain the boiling point of the mixture at above 200° C. and below 240° C., the amount of alkali metal compound being such that an aqueous inorganic liquid layer forms below said mixture, said aqueous inorganic liquid layer comprising alkali metal acid sulfate, sulfuric acid and water and ranging in composition from alkali metal acid sulfate containing only enough sulfuric acid and only enough water to give a liquid layer at the temperature of hydrolysis to a composition of 52% alkali metal acid sulfate, 37% sulfuric acid and 11% water, said percentages being by weight, allowing said layer to form continuously below said mixture, and withdrawing said aqueous inorganic liquid layer at a rate corresponding substantially to that at which it is formed.

2. A continuous process of effecting the hydrolysis of p-chlorobenzenesulfonic acid to chlorobenzene and recovering said chlorobenzene which comprises continuously boiling an organic mixture comprising a major proportion of p-chlorobenzenesulfonic acid, a minor proportion of sulfuric acid and a minor proportion of water at a temperature of at least 220 but less than 240° C., continuously removing vapors of water and chlorobenzene distilling from the boiling mixture, continuously condensing said vapors to recover the chlorobenzene, adding to said mixture during said boiling p-chlorobenzenesulfonic acid, adding to said mixture during said boiling an alkali metal compound capable of combining with sulfuric acid to form alkali metal acid sulfate, the amount of said added alkali metal compound being insufficient to combine with all of the sulfuric acid in the mixture, adding to said mixture during said boiling water in amount sufficient to maintain the boiling point of the mixture at at least 220 but less than 240° C., the amount of said alkali metal compound being such that an aqueous inorganic liquid layer forms below said mixture, said aqueous inorganic liquid layer comprising alkali metal acid sulfate, sulfuric acid and water and ranging in composition from alkali metal acid sulfate containing only enough sulfuric acid and only enough water to give a liquid layer at the temperature of hydrolysis to a compositoin of 52% alkali metal acid sulfate, 37% sulfuric acid and 11% water, said percentages being by weight, allowing said layer to form continuously below said mixture, and withdrawing said aqueous inorganic liquid layer at a rate corresponding substantially to that at which it is formed.

3. The process of claim 2 wherein the said added alkali metal compound is a compound of sodium.

4. The process of claim 2 wherein said added alkali metal compound is a compound of sodium and wherein it is added in such amount that said aqueous inorganic layer comprises from 68 to 72% of sodium acid sulfate, from 23 to 27% of sulfuric acid and from 4 to 6% of water, said percentages being by weight and totaling 100%.

5. The process of claim 2 wherein said p-chlorobenzenesulfonic acid is crude p-chlorobenzenesulfonic acid obtained by a by-product from the manufacture of 2,2-bis (p-chlorophenyl)-1,1,1-trichloroethane from chlorobenzene and chloral in the presence of concentrated sulfuric acid, said crude p-chlorobenzenesulfonic acid containing sulfuric acid and water.

6. The process of claim 2 wherein said alkali metal compound is sodium hydroxide.

7. The process of claim 2 wherein said alkali metal compound is sodium hydroxide and wherein said aqueous inorganic layer comprises sodium acid sulfate, sulfuric acid and water in approximately the weight ratio of 70/25/5.

RICHARD H. F. MANSKE.
ELWOOD B. TRICKEY.
GORDON S. MYERS.

REFERENCES CITED

The following references are of record in the file of this patent:

UNITED STATES PATENTS

| Number | Name | Date |
|---|---|---|
| 1,796,108 | Kalischer et al. | Mar. 10, 1931 |
| 1,822,982 | Rosch et al. | Sept. 15, 1931 |

OTHER REFERENCES

"Chemical Abstracts," vol. 32, col. 1549 (1938). Abstract of article by Vesely.

Certificate of Correction

Patent No. 2,511,166                                        June 13, 1950

RICHARD H. F. MANSKE ET AL.

It is hereby certified that errors appear in the printed specification of the above numbered patent requiring correction as follows:

Column 5, line 74, for the word "Motion" read *Molten*; column 6, lines 9 and 10, for "qualities" read *quantities*; column 8, line 42, for "obtanied by" read *obtained as*; and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*